(12) United States Patent
Perry-Eaton et al.

(10) Patent No.: US 12,043,500 B2
(45) Date of Patent: Jul. 23, 2024

(54) GATHERING SYSTEM AND METHODS OF USE THEREOF

(71) Applicant: United States Postal Service, Washington, DC (US)

(72) Inventors: Wayne Perry-Eaton, Leesburg, VA (US); Bradley Ydens, Haymarket, VA (US)

(73) Assignee: United States Postal Service, Washington, DC (US)

( * ) Notice: Subject to any disclaimer, the term of this patent is extended or adjusted under 35 U.S.C. 154(b) by 60 days.

(21) Appl. No.: 17/879,646

(22) Filed: Aug. 2, 2022

(65) Prior Publication Data
US 2023/0038066 A1 Feb. 9, 2023

Related U.S. Application Data

(60) Provisional application No. 63/228,942, filed on Aug. 3, 2021.

(51) Int. Cl.
*B65G 47/90* (2006.01)
(52) U.S. Cl.
CPC .................................. *B65G 47/901* (2013.01)

(58) Field of Classification Search
CPC ...... B65H 2701/1916; B65H 2301/321; B65H 31/3045; B65H 3/04; B65H 3/042; B65H 3/045; B65H 3/047; B65H 3/0692; B65H 3/0816; B65H 3/12
USPC ................................ 271/2, 149, 35, 11, 125
See application file for complete search history.

(56) References Cited

U.S. PATENT DOCUMENTS

| | | | | |
|---|---|---|---|---|
| 8,548,626 | B2 * | 10/2013 | Steltz | B25J 15/0023 |
| | | | | 294/213 |
| 8,967,688 | B2 * | 3/2015 | Wilson | E01H 1/1206 |
| | | | | 294/1.3 |
| 9,623,570 | B1 * | 4/2017 | Krahn | B25J 15/0085 |
| 10,016,902 | B2 * | 7/2018 | Podnar | B25J 15/022 |
| 10,086,519 | B2 * | 10/2018 | Wagner | B65G 47/91 |
| 2013/0318929 | A1 * | 12/2013 | Keane | B65H 29/26 |
| | | | | 53/475 |

\* cited by examiner

*Primary Examiner* — Gregory W Adams
(74) *Attorney, Agent, or Firm* — ArentFox Schiff LLP

(57) ABSTRACT

A system for gathering one or more mail items. The system includes a first gathering mechanism configured to press against a first of the mail or other articles, wherein the first gathering mechanism is configured to expand from a compact state to an expanded state. The area of surface contact between a first one of the one or more mail items and the first gathering mechanism increases when the first holder mechanism is in the expanded state.

19 Claims, 8 Drawing Sheets

GATHERING SYSTEM AND METHODS OF USE THEREOF

CLAIM TO PRIORITY AND CROSS-REFERENCE TO RELATED APPLICATION

The present Application for Patent claims priority to U.S. Provisional Application No. 63/228,942 entitled "Gathering System and Methods of Use Thereof" filed on Aug. 3, 2021. The entire contents of the aforementioned application is herby expressly incorporated by reference.

TECHNICAL FIELD

The present disclosure relates generally to a gathering system and method. Specifically, the disclosure relates system for gathering items within a tray or container.

DESCRIPTION OF THE RELATED TECHNOLOGY

Items, such as letters, envelopes, postcards, etc., may be received, transported, transferred, processed, collected, sorted, or the like, in containers such as trays. Items may be contained in different types of trays or processing mechanisms at various stages of transport and processing.

Improvements in the transport and processing of such items are desired.

SUMMARY

In accordance with one aspect of the disclosure, a system for gathering one or more mail items within a container having at least one opening on at least one end thereof is disclosed. The system includes a first gathering mechanism configured to press against a first of the mail or other articles within the container, wherein the first gathering mechanism is configured to fit through the at least one opening on the one end of the container and expand from a compact state to an expanded state. The area of surface contact between a first one of the one or more mail items and the first gathering mechanism increases when the first holder mechanism is in the expanded state.

In accordance with one aspect of the disclosure, a method for gathering one or more stacked or aligned flat items, which may include mail items or other articles within a container having at least one opening on at least one end thereof is disclosed. The method includes using a first gathering mechanism configured to press against a first of the mail or other articles within the container, wherein the first gathering mechanism is configured to fit through the at least one opening on the one end of the container when in a compact state and is further configured to expand to an expanded state, wherein the gathering mechanism does not fit through the at least one opening when in in the expanded state. The method further includes passing the gathering mechanism through the at least one opening while in the compact state and expanding the first gathering mechanism from the compact state to the expanded state once at least a portion of the gathering mechanism has passed through the at least one opening to gather the one or more stacked or aligned flat items, which may include mail items within the container.

In accordance with one aspect of the disclosure, a gathering apparatus for gathering one or more stacked or aligned flat items, which may include mail items or other articles within a container having at least a first opening on at least one end thereof and at least a second opening on a second end thereof is disclosed. The apparatus includes a first gathering mechanism configured to press against a first of the mail or other articles within the container, wherein the first gathering mechanism is configured to fit through the at least one opening on the one end of the container and expand from a compact state to an expanded state; wherein the first gathering mechanism does not fit through the at least one opening when in in the expanded state.

Additional advantages and features of these aspects will be set forth in part in the description that follows, and in part will become more apparent to those skilled in the art upon examination of the following or upon learning by practice of the disclosure.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1A:
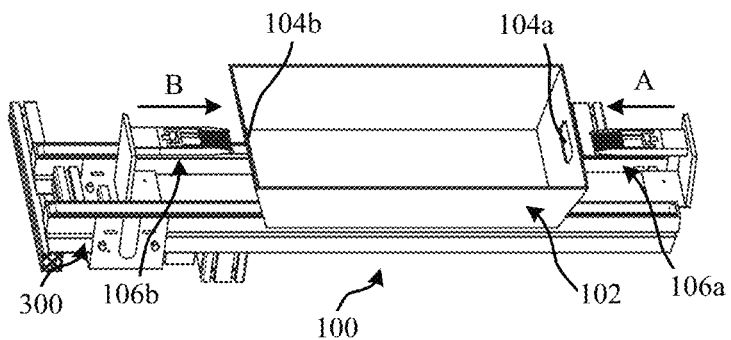
FIGS. 1A-1E are perspective views of an example gathering system in various configurations and stages of a gathering process for gathering and transferring mail items, with the mail items omitted from FIGS. 1A-1D for clarity, in accordance with aspects of the current disclosure.

The following includes definitions of selected terms employed herein. The definitions include various examples and/or forms of components that fall within the scope of a term and that may be used for implementation. The examples are not intended to be limiting. Further, it will be obvious to one skilled in the art that the present invention may be practiced without these specific details. In other instances, well-known methods, procedures, and components have not been described in detail so as to not unnecessarily obscure aspects of the present disclosure.

Throughout the disclosure, the term substantially or approximately may be used as a modifier for a geometric relationship between elements or for the shape of an element or component. While the terms substantially or approximately are not limited to a specific variation and may cover any variation that is understood by one of ordinary skill in the art to be an acceptable variation, some examples are provided as follows. In one example, the terms substantially or approximately may include a variation of less than 10% of the dimension of the object or component. In another example, the terms substantially or approximately may include a variation of less than 5% of the object or component. If the terms substantially or approximately are used to define the angular relationship of one element to another element, one non-limiting example of the terms may include a variation of 5 degrees or less. These examples are not intended to be limiting and may be increased or decreased based on the understanding of acceptable limits to one of ordinary skill in the art.

For purposes of the disclosure, directional terms are expressed generally with relation to a standard frame of reference when the system and apparatus described herein is installed and in an in-use orientation.

In order to provide context to the current disclosure, a broad overview of an example implementation of the system and apparatus in accordance with the current disclosure and the advantages provided by the disclosure are described below. Further details of example implementations of the current disclosure are described in detail below.

Aspects of the current disclosure are usable within a larger distribution network for the sorting and/or transportation of items. In one example, aspects of the current disclosure are usable with a distribution network for processing and/or transporting stacked or aligned flat items, which may include mail items. Stacked or aligned flat items, which may include mail items may be referred to throughout the disclosure as mail items. Some examples of mail items may include but are not limited to any one or a combination of letters, postcards, envelopes, or other stackable items, to name a few non-limiting examples. In processing mail items in a distribution network, mail items can be transported in containers, such as trays. The transportation of mail items in the distribution network may include manual transport, by workers for example, and/or may be automated via any one or a combination of machines used for transporting, sorting, or otherwise placing mail items. In some mail item processing implementations, two or more different types of containers for mail items may be used. For example, items may be received in a first type of container, such as a tray, which may be optimized for transport of mail items outside of a processing facility (e.g., may be flexible, lightweight, inexpensive to manufacture, configured with handles to ease manually holding the tray, sized and shaped to fit in an item collection system, or the like). When the first type of container, such as the tray, of mail items is received at a processing facility, the mail items mail items may need to be transported to another mechanism or container for further processing of the mail items within the facility. For example, a second type of container or other mechanism, such as but not limited to a second type of tray, may be configured to be compatible with automated processing machinery at the processing facility (e.g., may have structural features designed to interact with particular processing machines and/or may be more rigid or dimensionally stable to facilitate automated processing of mail items). In the example described above, mail items received in the first type of tray may need to be transferred to the second type of container or mechanism before at least a portion of the desired processing, e.g., automated processing, occurs. In one aspect the transportation of the mail items from the first type of container or mechanism to the second type of container or mechanism may be completed via an automated process by a robot or other transport machine or apparatus.

The present disclosure includes a tray content transfer systems configured to provide an automated process for gathering mail items in a source tray and transferring the mail items to a subsequent mechanism, container, or second tray, which may hereinafter be interchangeably referred to as a process tray. In order to transfer the mail items from the source tray to the process tray, it may be advantageous to gather or otherwise compact and/or align mail items within the source tray before transferring the mail items from the source tray to the process tray. In some aspects, the tray content transfer systems and a system for gathering mail items within the source tray may allow for more efficient, reliable, cost-effectively, and/or rapid transfer of mail items than in existing methods of tray content transfer. Although the present disclosure describes tray content transfer systems in the context of trays and flat items such as letter mail, it will be understood that other containers and items can be used without departing from the scope of the present disclosure. Further, the gathering system or method may be usable with other systems and/or as a standalone system without departing from the scope of this disclosure.

I. Overview of Example Gathering System and Method

Figure 1B:
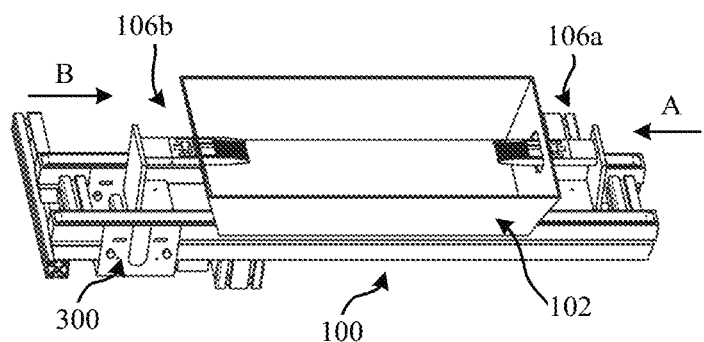
Figure 1C:
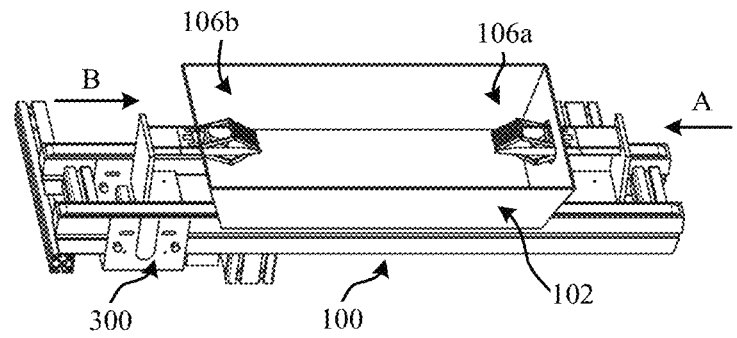
Figure 1D:
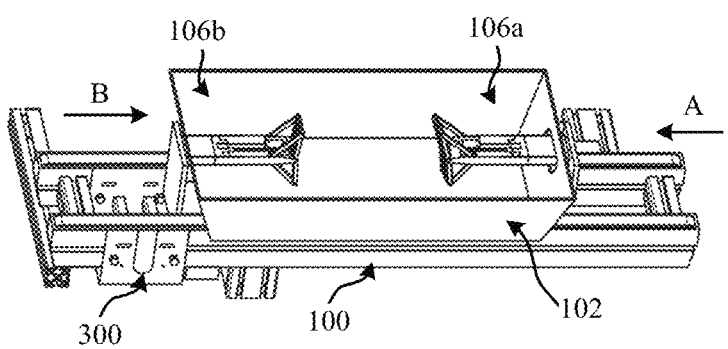
Figure 1E:
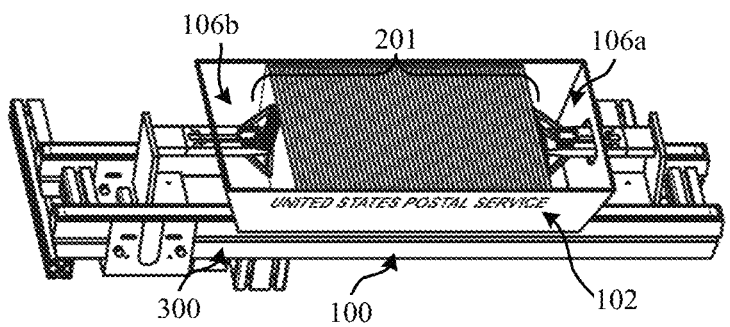

Referring to FIGS. 1A-1E, in one example aspect, a mail item tray 102 may contain a plurality of mail items 201 (FIG. 1E). Throughout the disclosure the terms tray or container may be used interchangeably. Mail items 201 may include any one or a combination of letters, postcards, envelopes, or other stackable items, to name a few non-limiting examples. In one example, the mail item tray 102 may be a source tray as described above. The plurality of mail items 201 may have been placed within the tray manually (e.g., via an employee) and/or may have been placed within the tray 102 via an automated system. In one example, the mail items 201 within the mail item tray 102 may be placed within the source tray via an automated process. For example, the mail items 201 may be placed within the tray via a robot or other automated moving or placing mechanism. In one example, the mail items 201 may be placed within the tray via a moving or placing mechanism similar to the holding apparatus 250 described with respect to FIGS. 1-4 below. As mentioned above, the source tray 102 may be optimized for transport of mail items outside of a processing facility (e.g., may be flexible, lightweight, inexpensive to manufacture, include handles for manual carrying, sized and shaped to fit in an item collection system, or the like). The source tray 102 may be placed onto or otherwise conveyed to the gathering system 100.

Figure 6A:
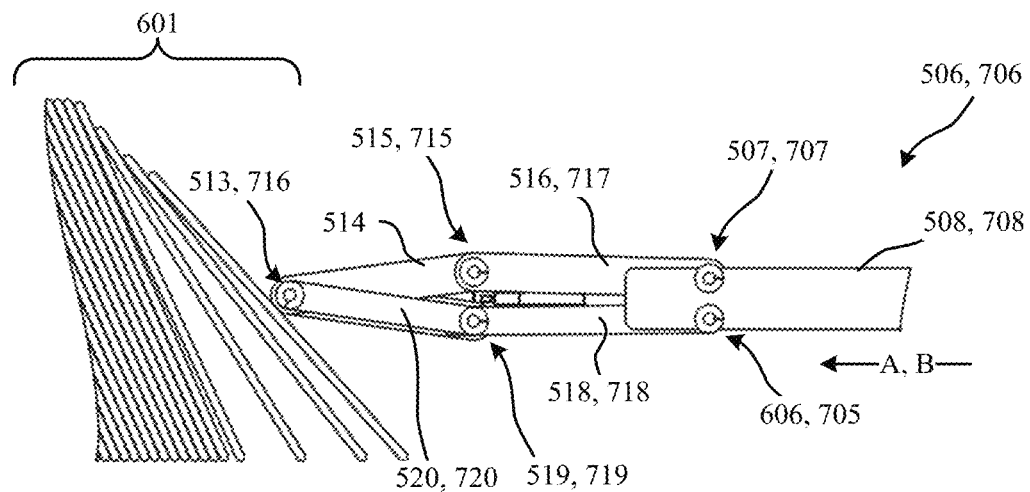
FIG. 6A is a side view of the gathering mechanism in a compact state in accordance with aspects of the current disclosure.
Figure 6B:
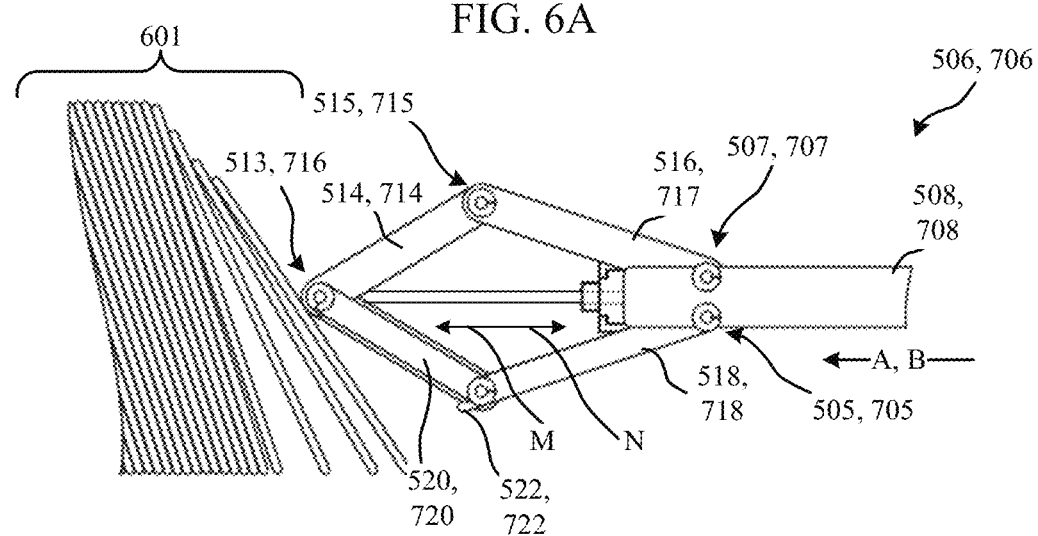
FIG. 6B is a side view of the gathering mechanism of FIG. 7A in a partially expanded state in accordance with aspects of the current disclosure.
Figure 6C:
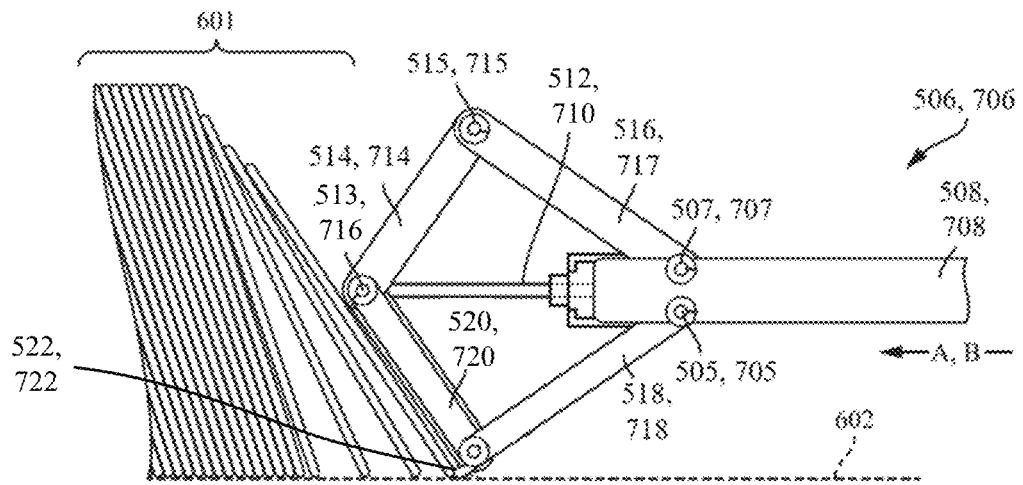
FIG. 6C is a side view of the gathering mechanism of FIGS. 7A and 7B in a partially expanded state in accordance with aspects of the current disclosure.

As labeled in FIG. 1A, the source tray 102 may have a set of handle openings 104a and 104b. The handle openings 104a and/or 104b may be used to lift the source tray 102. In one example, the source tray 102 may be a mobile tray or container with handle openings 104a and 104b that may be appropriately sized so that a user's or employee's fingers fit therethrough allowing a user to grip and lift the source tray 102 via the handle openings 104a and 104b. It is noted that while mail items (e.g., mail items 201 in FIG. 1E) are not shown in FIGS. 1A-1D to prevent obstruction of the view, the gathering system and/or process described below is intended to gather or otherwise align a plurality of mail items (e.g., mail items 201 in FIG. 1E) within the source tray 102, as shown in the example of FIGS. 6A-6C. A gathering system 100 in accordance with the current disclosure may include a first gathering mechanism 106a and/or a second gathering mechanism 106b. The first gathering mechanism 106a and/or the second gathering mechanism 106b may be configured to fit through a corresponding handle opening 104a and/or 104b and expand from a compact state (e.g., as shown in FIGS. 1A and 1B) to an expanded state (e.g., as shown in FIGS. 1D and 1E) after passing through corresponding handle opening 104a and/or 104b. The first gathering mechanism 106a and/or the second gathering mechanism 106b may be configured to expand from the aforementioned compact state to the expanded state either while moving inwards towards a center of the source tray 102 in directions A and B, respectively, and/or after clearing the handle openings 104a and/or 104b.

In one example, as shown in FIGS. 1A-1D, the first and second gathering mechanisms 106a and 106b may start movement inwards towards the center of the source tray 102 in directions A and B. As shown in the example in FIG. 1B, as the first gathering mechanism 106a and/or the second gathering mechanism 106b move in directions A and B, respectively, the gathering mechanisms 106a/106b may remain in the compact state as they pass through the respective handle opening 104a and/or 104b. One advantage of the compact state of the gathering mechanisms 106a and/or 106b is that it allows them to clear and/or otherwise pass through handle openings 104a and/or 104b and expand to a dimension that would not normally fit through handle openings 104a and/or 104b once at least a portion of the gathering mechanism passes through the handle openings 104a/104b. As shown in FIG. 1C, once the first gathering mechanism 106a and second gathering mechanism 106b pass through and fully clear respective handle openings 104a and/or 104b, they may begin expanding from a compact state to a partially expanded state. As shown in FIG. 1D, the first and second gathering mechanisms 106a and/or 106b may fully expand so that an area of surface contact between the first and/or second gathering mechanisms 106a and/or 106b and mail items (e.g., mail items 201 in FIG. 1E) increase as the first and/or second gathering mechanisms 106a/106b expand. As described in further detail below, the expansion and increased area of surface contact between the first and/or second gathering mechanisms 106a and/or 106b and mail items 201 within the source tray 102 may ensure that the mail items 201 within the source tray 102 are properly oriented and aligned in a stacked configuration for additional processing, as described in further detail below. Thus, one advantage of implementing the current disclosure is that the gathering mechanism(s) 106a and/or 106b are capable expanding to a size that would not normally fit through handle openings 104a and/or 104b of the source tray 102, which improves the gathering and alignment of the mail items 201 within the source tray 102 due to the increased surface area of the gathering mechanism(s) 106a and/or 106b in the expanded state.

In addition to being capable of clearing or otherwise passing through respective handle openings 104a and/or 104b, the gathering mechanism(s) 106a and/or 106b in accordance with the current disclosure are capable of holding mail items within tray 102 in alignment while further processing occurs. One example of further processing is described in the section below.

II. Example Implementation of Gathering System and Method

Figure 2:
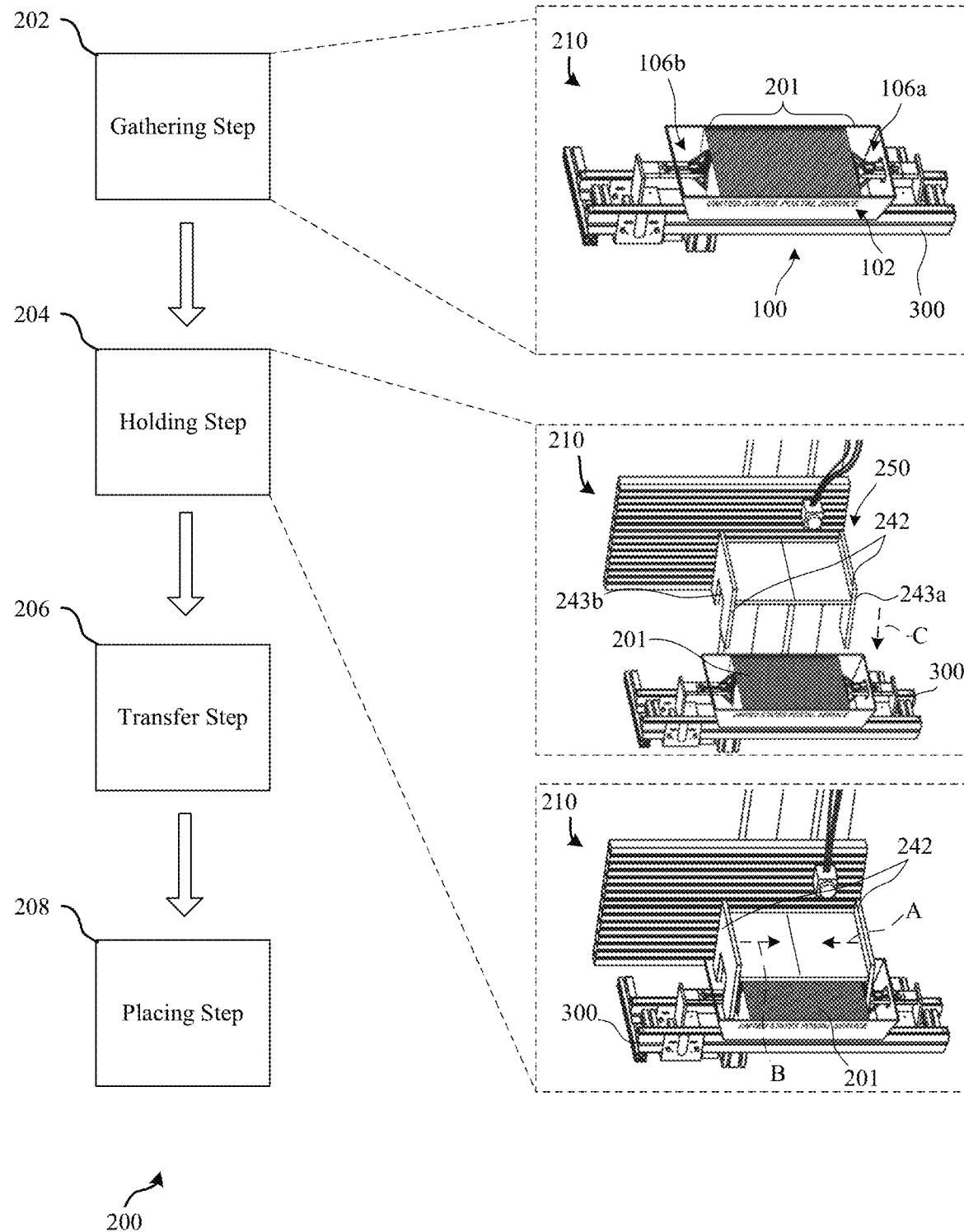
FIG. 2 is a flowchart of an example item processing method, including corresponding inset perspective views of an example item processing system, in accordance with aspects of the current disclosure.
Figure 3:
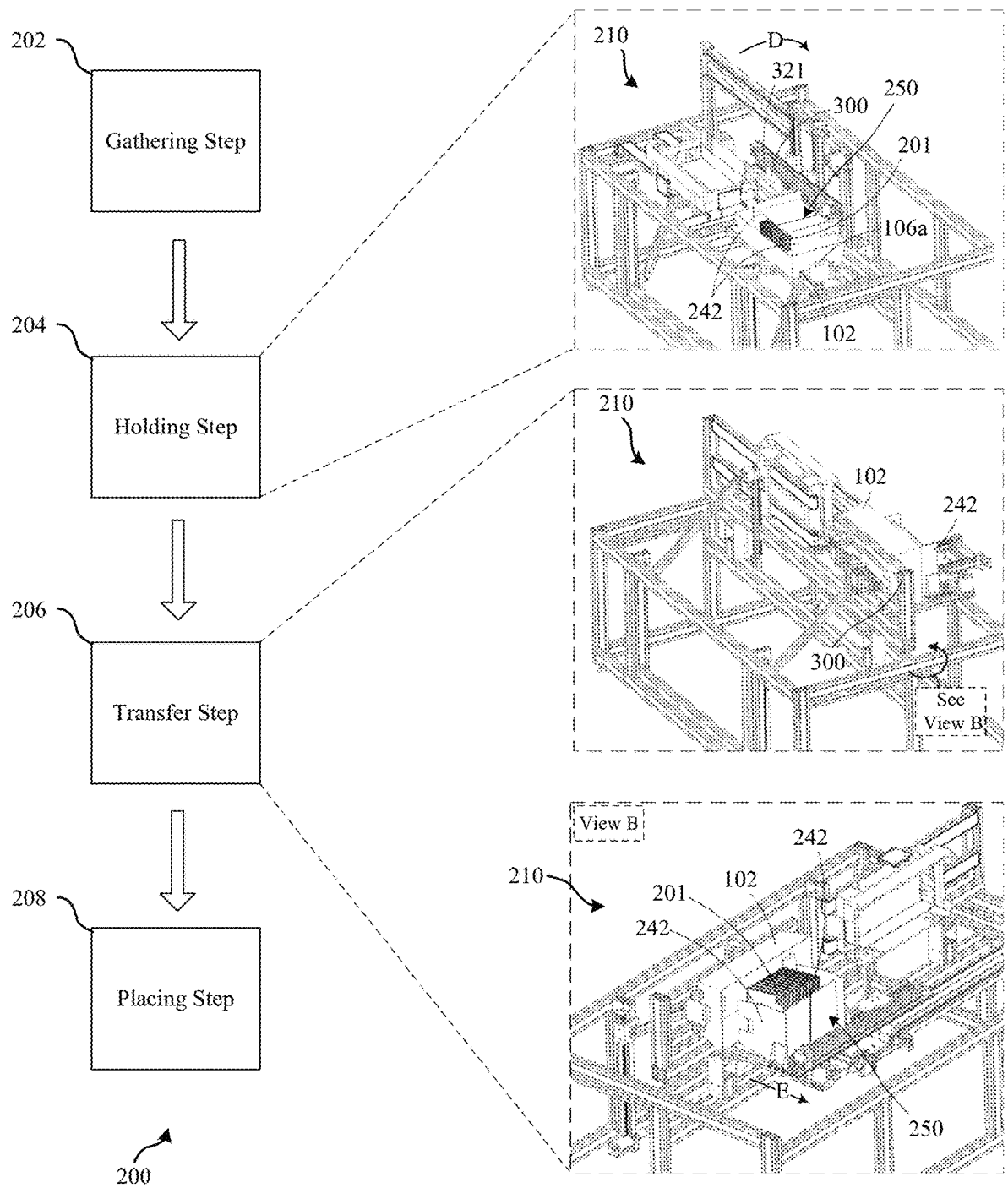
FIG. 3 is the flowchart of FIG. 2 with additional corresponding inset perspective views of the example item processing system in accordance with aspects of the current disclosure.
Figure 4:
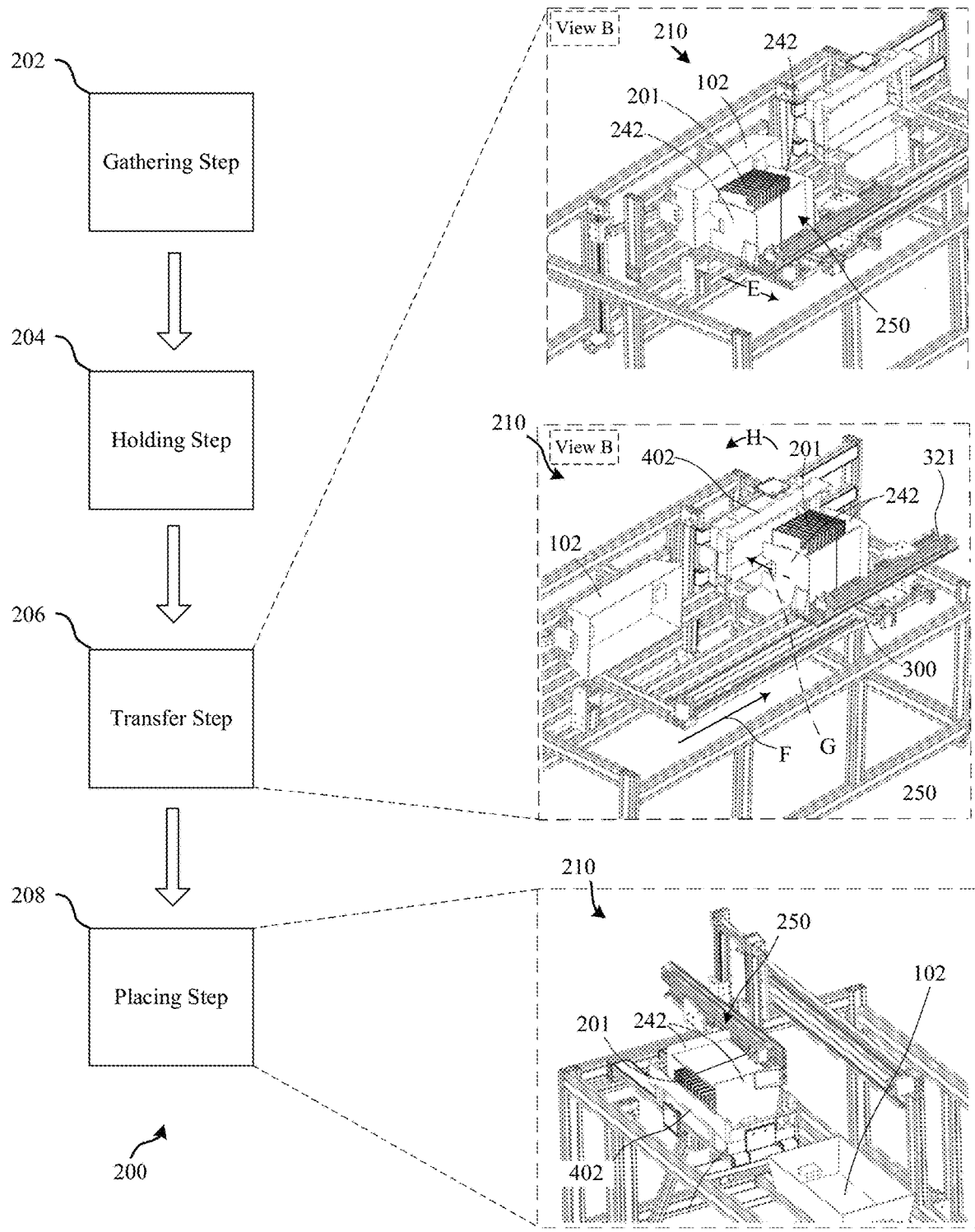
FIG. 4 is the flowchart of FIGS. 2 and 3 with additional corresponding inset perspective views of the example item processing system in accordance with aspects of the current disclosure.

Referring to FIGS. 2-4, an example method 200 of processing mail items is explained with reference to components of an example distribution system 210. It should be understood that this is one example method and system that is not intended to be limiting, as the current disclosure is not limited to use within a specific process or system. In some aspects, the method 200 may include a gathering step 202 for collecting and aligning mail items with a tray, a holding step 204 for applying force to grasp the mail items, a transfer step 206 for moving the mail items to a subsequent processing mechanism, and/or a placing step 208 for positioning and releasing the mail items to the subsequent processing mechanism. Prior to the gathering step 202, a tray such as the source tray 102 containing mail items, such as mail items 201, may be placed, secured, or otherwise provided to a transfer frame 300 with the first and second gathering mechanisms 106a and/or 106b mounted thereto. In one example, the transfer frame 300 may be rotatable but may remain in the upright orientation during the gathering step.

Once the source tray 102 is provided to the transfer frame 300, the gathering step 202 is performed using the gathering system 100. In addition to the graphical representation shown in FIG. 2, one example of the gathering step 202 is described above with respect to FIGS. 1A-1E. Once the mail items 201 within the source tray 102 are gathered or otherwise properly aligned in a stacked configuration by the first and/or second gathering mechanisms 106a and/or 106b, the mail items 201 within tray 102 may be subject to a holding step 204.

In the holding step 204, a holding apparatus 250 having paddles 242 may descend in direction C to a position within the source tray 102 so that the gathered mail items 201 are between the paddles 242. In one aspect, the paddles 242 may have a first and second clearance section(s) 243a and 243b. The first clearance section 243a and second clearance section 243b may be dimensioned so as to clear or otherwise prevent contact between the paddles 242 and the first gathering mechanism 106a and second gathering mechanism 106b as the holding apparatus 250 descends in direction C. In addition, the gathering mechanism(s) 106a and/or 106b may be shaped or dimensioned to fit with the clearance section(s) 243a and/or 243b. It is noted that while clearance section(s) 243a and 243b are shown as examples, the gathering mechanism(s) may be dimensioned or otherwise shaped to fit with clearance sections and/or to prevent interference between stationary and/or automated systems in a distribution system or other automated system. Once the holding apparatus 250 descends in direction C to a position partially within the source tray 102 so that the gathered mail items 201 are between the paddles 242, the paddles 242 move inwards towards the gathered mail items 201 in directions A and B to clasp or otherwise engage with the mail items 201.

Turning to FIG. 3, in one example implementation, after the paddles 242 clasp or otherwise engage with the mail items 201, the holding step 204 transitions to the transfer step 206 as the frame 300 rotates in direction D. For example, the frame 300 may rotate approximately 90° to 100° in direction D from an upright orientation to a rotated orientation so that mail items 201 previously within tray 102 rest on, and are aligned by, a rear surface of the holding apparatus 250, and not on the bottom surface of the source tray 102. Subsequently, in the transfer step 206, the holding apparatus 250 then moves linearly out of the source tray in direction E with the mail items 201 contained therein.

Turning to FIG. 4, after the holding apparatus 250 moves linearly out of the source tray in direction E with the mail items 201 contained therein, the holding apparatus 250 moves linearly in direction F via transfer apparatus track 321 to a position adjacent to a second tray or process tray 402, and moves linearly in direction G towards the process tray 402 such that the mail items 201 are generally within and/or aligned within a certain portion of the process tray 402. The frame 300 then rotates in direction G back to the upright orientation. In the placing step 208, the paddles 242 of the holding apparatus are moved apart to release the mail items 201 into the process tray 402.

The combination of rotational and linear motion can advantageously allow the transfer system to move articles such as letters from a first tray (e.g., tray 102) to a second tray (e.g., process tray 402) without lifting or suspending the articles over a space between the trays, where articles may be lost if dropped. Additional example aspects of an automated processing system that are usable with the gathering system and method of the current disclosure are further described in U.S. patent application Ser. No. 16/124,070 by Wayne Perry-Eaton et al., filed on Sep. 6, 2018 and titled "System and Method for Transferring Articles From a Container," the entire contents of which are incorporated by reference herein.

Alternative processing transfer step 206 may include placing the mail items 201 onto a mail item alignment apparatus instead of placing the mail items into a second tray or process tray (e.g., process tray 402). In this alternative example, the mail items are placed onto a mail alignment apparatus that has two or more dividers to hold the mail items in an upright position. After the mail items 201 are placed by the holding apparatus 250 onto on a support surface of the alignment apparatus and between at least two of the two or more dividers of the mail alignment apparatus, at least two of the two or more dividers are configured to move back-and-forth in conjunction with one another along the support surface while holding the mail items 201 therebetween to further align or otherwise ensure that mail items 201 are suitably aligned. In one aspect, the support surface is configured to vibrate while the two or more dividers move back-and-forth along the support surface which may further assist with the alignment of the mail items by shaking loose any "stuck" or otherwise misaligned individual mail items 201. Once the mail items are aligned via the aforementioned process, the mail items may be moved along the support surface along a linear direction to a storage portion and/or a process tray or other tray or storage container. In one example, the support surface may include a dipped section or curved section which may further assist with the proper alignment of the mail items 201 while they are conveyed along the support surface by the two or more dividers mentioned above. Once the dividers of the mail alignment apparatus convey the mail items to a storage portion and/or a process tray or other tray or storage container the dividers may pivot upwards in order to clear the mail items and move back to a location proximal to the holding apparatus 250 in preparation for the alignment and/or transport of a second plurality of mail items.

Additional example aspects of an automated processing system that are usable with the gathering system and method of the current disclosure are further described in U.S. patent application Ser. No. 14/869,843 by Christopher M. Stratton et al., filed on Sep. 29, 2015 and titled "Transformable Tray and Tray System for Receiving, Transporting and Unloading Items," the entire contents of which are incorporated by reference herein.

Further details of example implementations of the gathering mechanism 100 useable with the aforementioned gathering system used to perform the gathering step 202 are described in the section below.

III. Example Gathering Mechanisms

Figure 5A:
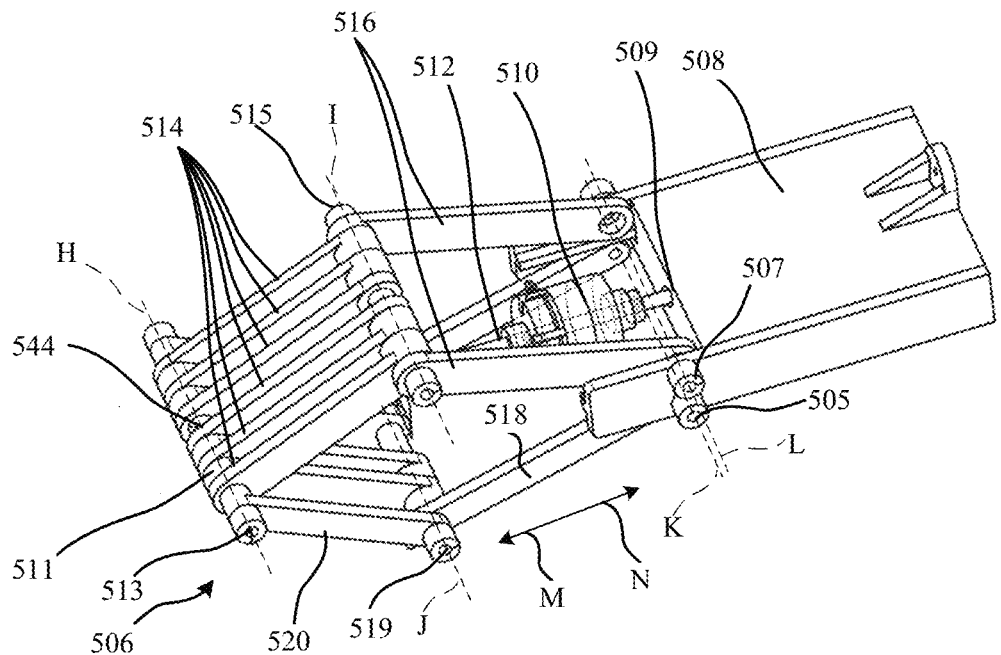
FIG. 5A is a perspective view of a gathering mechanism in a first state of operation in accordance with aspects of the current disclosure.
Figure 5B:
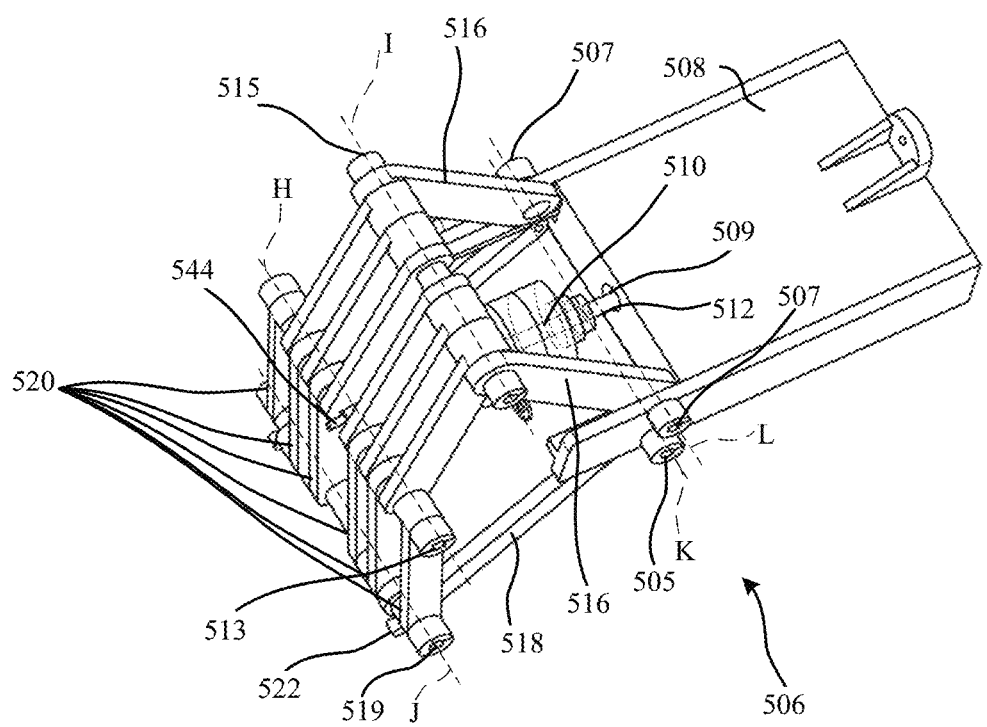
FIG. 5B is a perspective view of the gathering mechanism in a second state of operation in accordance with aspects of the current disclosure.

FIGS. 5A, 5B, and 6A-6C show perspective views of an example implementation of a gathering mechanism 506, which may be the same as or similar to gathering mechanisms 106a and/or 106b discussed above. FIG. 5A shows one example of the gathering mechanism 506 in a partially expanded configuration. The gathering mechanism 506 may include a gathering mechanism body 508 having a translation portion 510 connected thereto. In one example, the translation portion 510 may be a linear actuator. Some examples of liner actuators usable as the translation portion 510 may include but are not limited to electric, pneumatic, and/or hydraulic actuators, to name a few examples. In addition, the translation portion 510 may include any one or a combination of a linear actuator, a solenoid, a screw type or ball-screw-drive type actuator, a rack and pinion type actuator and/or a track and/or slide-type actuator. In one preferred aspect, the translation portion 510 comprises a linear actuator with a shaft 512 configured to interact with the one or more pivot members and/or link members to controllably transition the gathering mechanism 506 between a compact state and an expanded state. For example, the translation portion 510 is configured to translate shaft 512 along an axis in directions M and N (FIGS. 5A and 6B). As shown in FIGS. 5A and 5B, a first end or distal end 544 of the translation portion 510 is operatively connected, directly or indirectly via a connecting member, to a first pivot 513, e.g., a rod or axle, that provides a pivotable connection between a first front link or first series of front links 514 and a second front link or series of front links 520. The first pivot 513 may allow a first series of front links 514 and a second series of front links 520 to rotate about axis H. In one example the first series of front links 514 and second series of front links 520 may each have through holes allowing for a bolt or shaft to pass therethrough and thus forming a pivotable interface allowing each of the first series of front links 514 and second series of front links 520 to pivot about axis H. In one example, first series of front links 514 and second series of front links 520 may be formed as flat links that are spaced from one another along axis H via a series of spacers (e.g., spacer 511 shown in FIG. 5A). In an aspect, the spacer 511 may be an end of an adjacent one of the second series of front links 520. In another aspect, the spacer 511 may be a separate component, such as a washer, configured to reduce friction during relative rotation of the first series of front links 514 and the second series of front links 520. While each spacer 511 is not labeled in FIGS. 5A and 5B to prevent obstruction of the figures, in one non-limiting example, the first series of front links 514 may comprise six (6) individual links, and may be configured with spacers 511 and/or one end of the series of second links 520 between opposing ones of the first series of front links 514. As shown in FIGS. 5A and 5B, in one example implementation, six (6) individual first front links 514 and six (6) individual second front links may all be connected via the first pivot 513, including one spacer 511 between each set of opposing ones of the first front links 514 and second front links 520 except for a middle set where the shaft 512 is connected to the first pivot 513. The combination of first front links 514 and second front links 520 rotatably connected at first pivot 513 and separated by one or more spacers allows the gathering mechanism 506 to expand and/or contract in order to pass through an opening in a tray, e.g., one of handle openings 104*a* and 104*b* in source tray 102 as discussed above, while providing an expanded surface to contact and gather mail items 201 within a tray (e.g., as shown in FIG. 1E). It is noted that while a specific number of links is shown in FIGS. 5A and 5B, the first series of front links 514 and second series of front links 520 may include any number of links (e.g., 2-15 links). In another example, the first series of front links 514 and/or the second series of front links 520 may be replaced with a single link having a surface that extends to form a width equivalent to the respective series of links.

The gathering mechanism 506 may further include a series of first rear links 516 and a series of second rear links 518 to connect the gathering mechanism body 508 to the first series of front links 514 and second series of front links 520. As shown in the examples in FIGS. 5A-6C, the first rear links 516 may include two links connected to the gathering mechanism body 508 at a first end of each respective link via a first rear pivot 507. As shown in FIGS. 5A-6C, the first rear pivot 507 may be configured to allow the first rear links 516 to rotate about axis L. The second end of each of the first rear links 516 may be connected to an end of the first series of front links 514 via an front upper pivot 515 and may be configured to be rotatable with respect to one another about axis I.

Further, as shown in the examples in FIGS. 5A-6C, the second rear links 518 may include two links connected to the gathering mechanism body 508 at a first end of each respective link via a second rear pivot 505. The second rear pivot 505 may be configured to allow the second rear links 518 to rotate about axis K. The second end of each of the second rear links 518 may be connected to an end of the second series of front links 520 via an front lower pivot 519 and may be configured to be rotatable with respect to one another about axis J. It is noted that while two first rear links 516 and two second rear links 518 are shown in FIGS. 5A and 5B, the first rear links 516 and/or the second rear links 518 may include any number of links (e.g., 2-10 links). In another example, the first rear links 516 and/or the second rear links 518 may be replaced with a single link having a surface that extends to form a width equivalent to the respective two rear links. In one example, any two or more or all of the links within the gathering mechanism 506 may be identical to provide for ease of maintenance by allowing the links to be interchangeable. Similarly, any one or a combination of the spacers 511 provided between the links and/or the bolts or shafts that comprise any one or a combination of pivots 505, 507, 513, 515 and/or 519 may use similar or identical hardware and/or components allowing for interchangeability of parts for ease of maintenance.

It is noted that the links mentioned above (e.g., first series of front links 514, second series of front links 520, first rear links 516 and/or second rear links 518) may be formed of any material with sufficient rigidity to provide and/or transfer a gathering or pressing force to mail items 201. In one preferred aspect, the links may be formed of a material comprising aluminum or steel. However, it is noted that the links may also be formed of a composite material and/or a rigid plastic, to name a few additional examples.

Figure 6D:
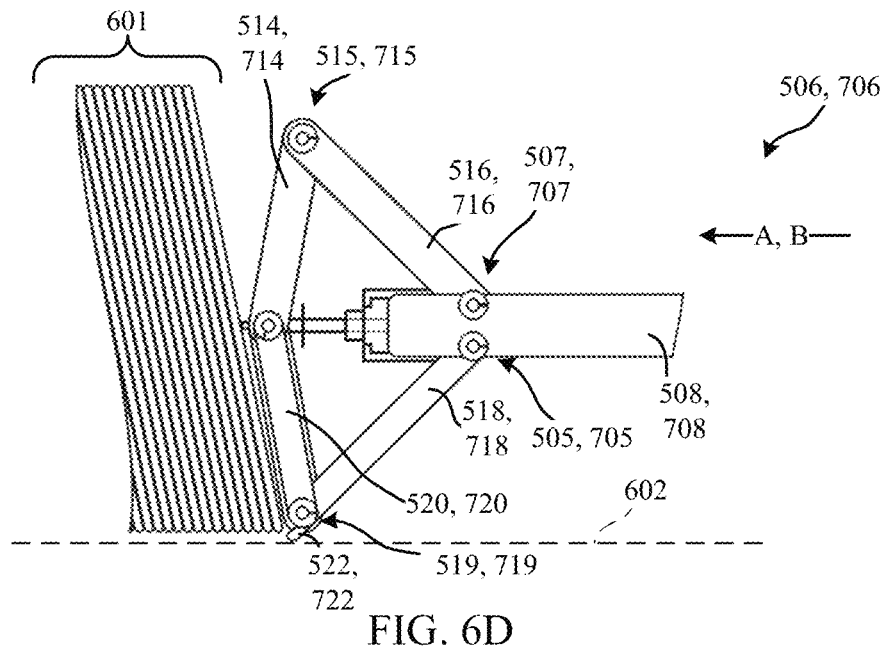
FIG. 6D is a side view of the gathering mechanism of FIGS. 6A-6C in a partially expanded state in accordance with aspects of the disclosure.
Figure 6E:
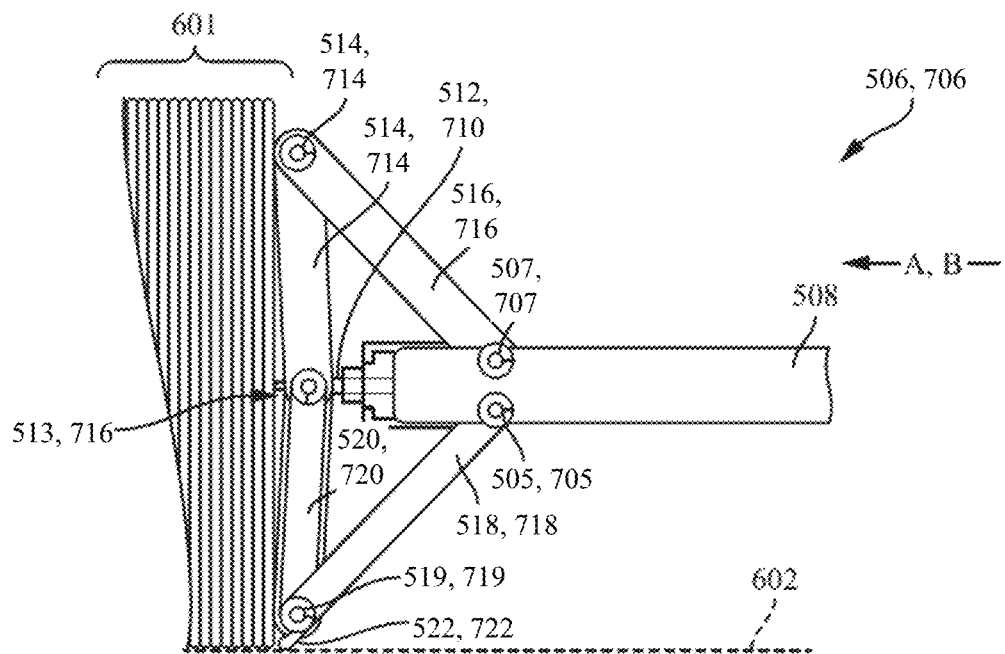
FIG. 6E is a side view of the gathering mechanism of FIGS. 6A-6D in an expanded state in accordance with aspects of the disclosure.

As shown in FIGS. 5A-5B, a distal end 544 of the shaft 512 of the translation portion 510 may be connected at the front pivot 513 to control expansion and contraction of the first series of front links 514 and the second series of front links 520. Thus when the shaft 512 of the translation portion 510 moves in direction N (FIGS. 5A and 6C) the gathering mechanism 506 expands as shown in FIGS. 5A and 5B. Likewise, when the shaft 512 of the translation portion 510 moves in direction M, the gathering mechanism 506 contracts to a compact state as shown in FIGS. 5A and 6A. The expansion and contraction from a compact state to the expanded state may allow for gathering of mail items within a tray or an another surface (e.g., surface 610). In one example, the compact state may allow the gathering mechanism 506 to clear or otherwise prevent interference between the gathering mechanism 506 and another component. For example, the expansion and contraction may allow the gathering mechanism 506 to clear or otherwise pass-through handle openings (e.g., handle openings 104*a* and 104*b* as described with respect to FIGS. 1A-1E) of a tray (e.g., source tray 102 in FIGS. 1A-1E and 2-4) and expand so as to increase the contact surface area between the gathering mechanism 506 and mail items within a tray. FIGS. 6A-6E show one advantage of the orientation of the links during the expansion process and the increase of the surface contact area between the gathering mechanism and mail items 601 within a tray, where mail items 601 may be the same as or similar to mail items 201 described above. As shown in FIG. 6A, mail items 601 within the mail tray may be angled or otherwise out of alignment. As the shaft 512 (see FIGS. 6B-6E) of the translation portion 510 is moved in direction M, the first series of front links 514 pivot upwards and the second series of front links 520 pivot downward, which not only increases a contact area between the gathering mechanism 506 and the mail items 601 as shown in FIGS. 6C-6E, but also causes any misaligned or angled mail items 601 to "stand up" or otherwise align with the rest of the mail items 601 within the tray, and/or allows for angled mail items 601 to be shifted from an angled orientation to a more vertical stacked orientation. As mentioned above with respect to FIGS. 1A-1E, the gathering mechanism 506 may expand from the compact state (e.g., as shown in FIGS. 5A and 6A) to the expanded state (e.g., as shown in FIGS. 5B and 6E) as the gathering mechanism(s) 506 are moved towards the center of a tray in a directions A and/or B. As shown in FIG. 6E, as the gathering mechanism 506 expands from the compact state to the fully expanded state, the front links 514 and 520 may a surface that is angled inward and/or concave. The inward angling surface may additionally assist with gathering and/or alignment of the mail items 601 on bottom surface 602.

In an alternative or additional aspect, to further assist with the alignment of the mail items 601 and/or to gather any mail items 601 that may be flat against a bottom surface 602 of a tray or other container, the gathering mechanism 506 may further include one or any number of gathering protrusions 522 to provide a lifting force to an end of such mail items 601. In one example implementation, the gathering protrusions 522 may extend from the ends of the second rear links 518 and may be formed as a rounded protrusion that is in close proximity and/or contacts a bottom of a tray (indicated as dotted line 602 in FIGS. 6A-6E). As shown in FIGS. 6C-6E, the gathering protrusion 522 may further assist with gathering and alignment of mail items 601 within a tray by either forcing any misaligned mail items 601 into alignment and/or by sweeping or causing any mail items 601 that are laying along the surface of the bottom surface 602 of the tray to "stand up" into alignment into a stacked configuration as shown in FIG. 6E. Thus, by combining the features disclosed above with one or more gathering protrusions 522, the gathering mechanism 506 in accordance with the current disclosure provide further consistency and efficiency in aligning or gathering mail items 601 within a tray, which may be helpful in preparing the tray and mail items 601 for further processing, especially in an automated system.

Figure 7A:
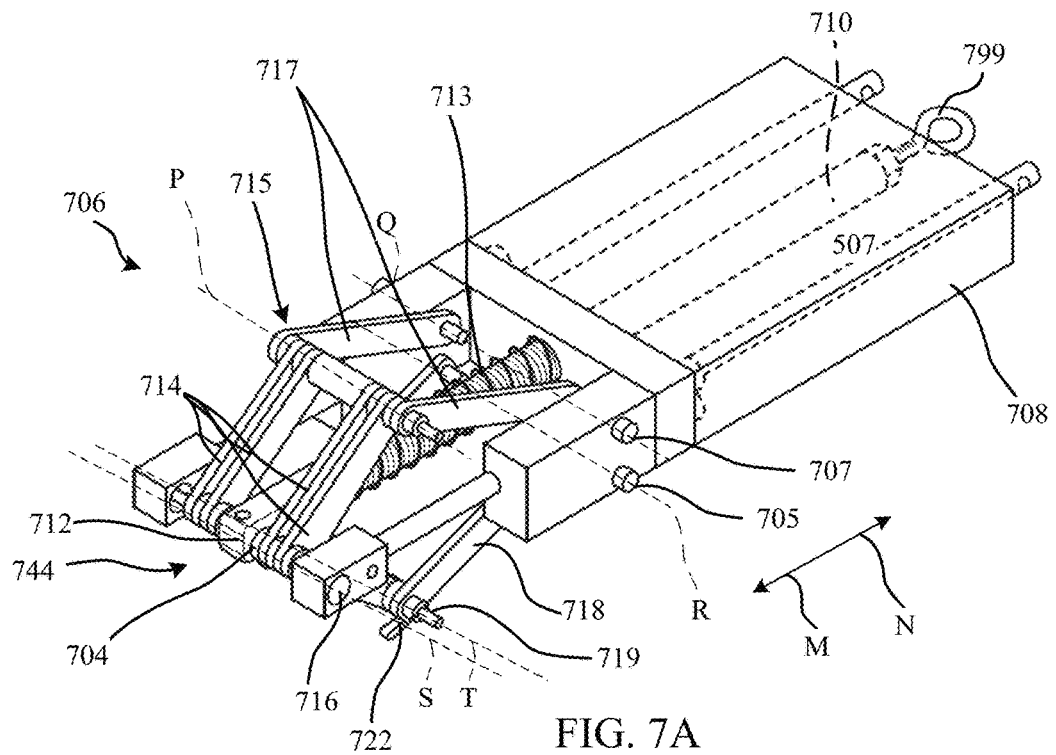
FIG. 7A is a perspective view of an alternative gathering mechanism in a first state of operation in accordance with aspects of the current disclosure.
Figure 7B:
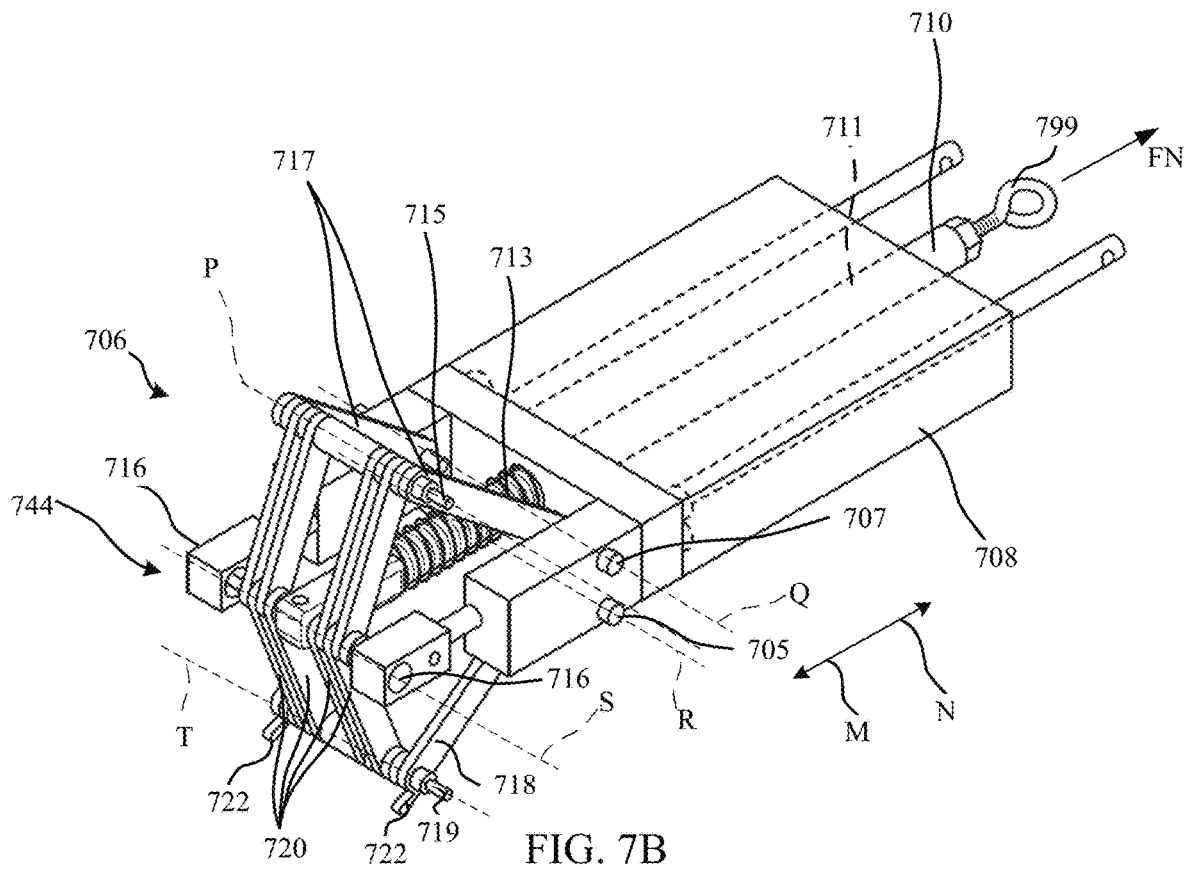
FIG. 7B is a perspective view of the gathering mechanism of FIG. 7A in a second state of operation in accordance with aspects of the current disclosure.

FIGS. 7A and 7B show perspective views of another example implementation of a gathering mechanism 706, which may be analogous with, similar to or similar in operation as the gathering mechanisms 106a and/or 106b discussed above. In operation, the aspects described above with respect to FIGS. 6A-6E are applicable to the alternative example gathering mechanism 706 described below with respect to FIGS. 7A and 7B. FIG. 7A shows one example of gathering mechanism 706 in a partially expanded configuration and FIG. 7B shows one example of the gathering mechanism 706 in a second partially expanded position. The gathering mechanism 706 may include a gathering mechanism body 708 having a translation portion 710 that is configured to translate therethrough within a body translation passage 711. In one example, the translation portion 710 may be biased in direction M by a biasing member 713. In one example, the biasing member 713 may for example be a spring that is configured to have the translation portion 710 passed therethrough so that the spring provides a force in direction M and biases the links described below to pivot to a compact state (e.g., as shown in FIG. 6A. In some alternative examples, the translation portion 710 and/or the biasing member 713 may for example be replaced with a linear actuator or solenoid. For example, the translation portion 710 may be a linear actuator or solenoid that is electric, pneumatic, and/or hydraulic, to name a few examples.

In addition, the translation portion 510 may include any one or a combination of a linear actuator, a solenoid, a screw type or ball-screw-drive type actuator, a rack and pinion type actuator and/or a track and/or slide-type actuator.

In one preferred aspect, the translation portion 710 pivotally connected to front links 714 of the gathering mechanism 706 via a translation portion connector 712 to controllably transition the gathering mechanism 706 from a fully compact state (e.g., as shown in FIGS. 1A, 1B, and 6A) and a fully expanded state (e.g., as shown in FIGS. 1D, 1E, and 6E). For example, the translation portion 710 is configured to translate within body translation passage 711 in directions M and N, causing the gathering mechanism 706 to translate to a full compact state when the translation portion 710 translates, within body translation passage 711, in direction M with respect to gathering mechanism body 708. Likewise, the translation portion is also configured to cause the gathering mechanism 706 to translate to a fully expanded state when the translation portion 710 moves in direction N with respect to gathering mechanism body 708 within body translation passage 711.

As shown in FIGS. 7A and 7B, a first end or distal end 744 of the translation portion 710 is operatively connected, directly or indirectly via a connecting member, to a first pivot 716, e.g., a rod or axle, that provides a pivotable connection between a first front link or first series of front links 714 and a second front link or series of front links 720. The first pivot 716 may allow a first series of front links 714 and a second series of front links 720 to rotate about axis S. In one example, the first series of front links 714 and second series of front links 720 may each have through holes allowing for a bolt or shaft to pass therethrough and thus forming a pivotable interface allowing each of the first series of front links 714 and second series of front links 720 to pivot about axis S. In one example, first series of front links 714 and second series of front links 720 may be formed as flat links that are spaced from one another along axis S via a series of spacers (e.g., spacer 704 shown in FIG. 7A).

In an aspect, the spacer 704 may be an end of an adjacent one of the second series of front links 720. In another aspect, the spacer 704 may be a separate component, such as a washer, configured to reduce friction during relative rotation of the first series of front links 714 and the second series of front links 720. While each spacer 704 is not labeled in FIGS. 5A and 5B to prevent obstruction of the Figures, in one non-limiting example, the first series of front links 714 may comprise four (4) individual links and may be configured with spacers 704 and/or one end of the series of second links 720 between opposing ones of the first series of front links 714. As shown in FIGS. 7A and 7B, in one example implementation, four (4) individual first front links 714 and four (4) individual second front links may all be connected via the first pivot 716, including one spacer 704 between each set of opposing ones of the first front links 714 and second front links 720 except for a middle set where the translation portion connector 712 is connected to the first pivot 716. The combination of first front links 714 and second front links 720 rotatably connected at first pivot 716 and separated by one or more spacers allows the gathering mechanism 706 to expand and/or contract in order to pass through an opening in a tray, e.g., one of handle openings 104a and 104b in source tray 102 as discussed above, while providing an expanded surface to contact and gather mail items 201 within a tray (e.g., as shown in FIG. 1E). It is noted that while a specific number of links is shown in FIGS. 7A and 7B, the first series of front links 714 and second series of front links 720 may include any number of links (e.g., 2-15 links). In another example, the first series of front links 714 and/or the second series of front links 720 may be replaced with a single link having a surface that extends to form a width equivalent to the respective series of links.

The gathering mechanism 706 may further include a series of first rear links 717 and a series of second rear links 718 to connect the gathering mechanism body 708 to the first series of front links 714 and second series of front links 520. As shown in the examples in FIGS. 5A-6C, the first rear links 717 may include two links connected to the gathering mechanism body 708 at a first end of each respective link via a first rear pivot 707. As shown in FIGS. 7A and 7B, the first rear pivot 707 may be configured to allow the first rear links 717 to rotate about axis Q. The second end of each of the first rear links 717 may be connected to an end of the first series of front links 714 via a front upper pivot 715 and may be configured to be rotatable with respect to one another about axis P.

Further, as shown in the examples in FIGS. 7A and 7B, the second rear links 718 may include two links connected to the gathering mechanism body 708 at a first end of each respective link via a second rear pivot 705. The second rear pivot 705 may be configured to allow the second rear links 718 to rotate about axis K. The second end of each of the second rear links 718 may be connected to an end of the second series of front links 720 via a front lower pivot 719 and may be configured to be rotatable with respect to one another about axis T. It is noted that while two first rear links 717 and two second rear links 718 are shown in FIGS. 7A and 7B, the first rear links 717 and/or the second rear links 718 may include any number of links (e.g., 2-10 links).

In another example, the first rear links 717 and/or the second rear links 718 may be replaced with a single link having a surface that extends to form a width equivalent to the respective two rear links. In one example, any two or more or all of the links within the gathering mechanism 706 may be identical to provide for ease of maintenance by allowing the links to be interchangeable. Similarly, any one or a combination of the spacers 704 provided between the links and/or the bolts or shafts that comprise any one or a combination of pivots 705, 707, 715, 717, and/or 719 may use similar or identical hardware and/or components allowing for interchangeability of parts for ease of maintenance.

Similar to the example described above with respect to FIGS. 5A and 5B, it is noted that the links mentioned above (e.g., first series of front links 714, second series of front links 720, first rear links 717 and/or second rear links 718) may be formed of any material with sufficient rigidity to provide and/or transfer a gathering or pressing force to mail items 201. In one preferred aspect, the links may be formed of a material comprising aluminum or steel. However, it is noted that the links may also be formed of a composite material and/or a rigid plastic, to name a few additional examples.

As shown in FIGS. 7A-7B, a distal end 744 of the translation portion connector 712 at the end of the translation portion 710 may be connected at the front pivot 716 to control expansion and contraction of the first series of front links 714, second series of front links 720, first rear links 717 and second rear links 718. Thus, when the translation portion 710 moves in direction N due to a force FN being applied via the translation portion and/or due to the translation portion 710 being stationarily held and/or controllably stopped and held while the gathering mechanism body 708 is moved in direction M, the gathering mechanism 706 expands as shown in FIGS. 1D, 1E, 6E, and 7B, for example. Conversely, when the translation portion 710 moves in direction M within the body translation passage 711, either due to a force being applied to the translation in direction M, the translation portion 710 being stationarily held while the gathering mechanism body 708 is moved in direction N, and/or a force applied by the biasing member 713, the gathering mechanism 706 contracts to a compact state as shown in FIGS. 1A, 1B, 6A, and 7A, for example. In one example, the translation portion 710 is for example stationarily held or otherwise retained by a cable connected to the eyelet 799, and movement of the gathering mechanism body 708 in direction N and/or force applied by the biasing member 713 generally in directions M and N causes the distal end 744 to move away from the gathering mechanism body 708, thus causing the contraction of the gathering mechanism body 708 to the contracted state, for example when the gathering mechanism 706 is to be withdrawn from the handle openings 104a and/or 104b. It is noted that while the features of the example described above with respect to FIGS. 7A and 7B are variants of the features described above with respect to FIGS. 5A and 5B, the example in FIGS. 7A and 7B and the expansion and contraction thereof from a compact state to the expanded state may allow for gathering of mail items within a tray or an another surface (e.g., surface 610 in FIG. 6A-6E) in a similar fashion as described above with respect to FIGS. 6A-6E. Just as in the Examples described above with respect to FIGS. 1A-6E, the compact state of the example described above with respect to FIGS. 7A and 7B may allow the gathering mechanism 706 to clear or otherwise prevent interference between the gathering mechanism 706 and another component. For example, the expansion and contraction may allow the gathering mechanism 706 to clear or otherwise pass-through handle openings (e.g., handle openings 104a and 104b as described with respect to FIGS. 1A-1E) of a tray (e.g., source tray 102 in FIGS. 1A-1E and 2-4) and expand so as to increase the contact surface area between the gathering mechanism 706 and mail items within a tray. FIGS. 6A-6E show example steps of the operation of the gathering mechanism 706 in FIGS. 7A and 7B. It is noted that some features in FIGS. 6A-6E have been generalized or simplified. However, one of ordinary skill in the art would understand the specific operation in the context of the features of FIGS. 7A and 7B.

One advantage of the orientation of the links during the expansion process and the increase of the surface contact area between the gathering mechanism and mail items 601 within a tray, where mail items 601 may be the same as or similar to mail items 201 described above. As shown in FIG. 6A, mail items 601 within the mail tray may be angled or otherwise out of alignment. As the gathering mechanism 706 moves in direction A or B, the translation portion 710 (see FIGS. 7A-7B) is stationarily held by a cable or other holding member, which may be connected to eyelet 799 (FIGS. 7A-7B), for example thus overcoming the force provided by biasing member 713 and causing the translation portion 710 to translate in direction N within the body translation passage 711 (FIG. 7B). As the translation portion 710 is moved in direction N, the first series of front links 714 pivot upwards and the second series of front links 720 pivot downward, which not only increases a contact area between the gathering mechanism 706 and the mail items 601 as shown in FIGS. 6C-6E, but also causes any misaligned or angled mail items 601 to "stand up" or otherwise align with the rest of the mail items 601 within the tray, and/or allows for angled mail items 601 to be shifted from an angled orientation to a more vertical stacked orientation. As mentioned above with respect to FIGS. 1A-1E, the gathering mechanism 706 may expand from the compact state (e.g., as shown in FIGS. 6A and 7A) to the expanded state (e.g., as shown in FIGS. 6E and 7B) as the gathering mechanism(s) 706 are moved towards the center of a tray in a directions A and/or B. As shown in FIG. 6E, as the gathering mechanism 706 expands from the compact state to the fully expanded state, the front links 714 and 720 may form a surface that is angled inward and/or concave. The inward angling surface may additionally assist with gathering and/or alignment of the mail items 601 on bottom surface 602.

Once the mail 601 are removed from the tray, for example via the paddles 242 as described with respect to FIGS. 1A-4 above, the gathering mechanism(s) 706 may be moved away from the center of a tray, opposite directions A and/or B. As the gathering mechanism(s) 706 are moved away from the center of the tray, the force provided by the biasing member 713 may cause the translation portion 710 to translate within the body translation passage 711 (FIG. 7B) in direction M, which may cause the first series of front links 714 pivot downward and the second series of front links 720 pivot upward thus retracting the expansion of the gathering mechanism 706 and decreasing the size of the gathering mechanism 706 and allowing the gathering mechanism 706 to be withdrawn from the handle openings (e.g., handle openings 104a and 104b) of the source tray 102.

Turning back to FIGS. 7A and 7B, in an alternative or additional aspect, to further assist with the alignment of the mail items 601 and/or to gather any mail items 601 that may be flat against a bottom surface 602 of a tray or other container, the gathering mechanism 706 may further include one or any number of gathering protrusions 722 to provide a lifting force to an end of such mail items 601. In one example implementation, the gathering protrusions 722 may extend from the ends of the second rear links 718 and may be formed as a rounded protrusion that is in close proximity and/or contacts a bottom of a tray (indicated as dotted line 602 in FIGS. 6A-6E). As shown in FIGS. 6C-6E, the gathering protrusion 722 may further assist with gathering and alignment of mail items 601 within a tray by either forcing any misaligned mail items 601 into alignment and/or by sweeping or causing any mail items 601 that are laying along the surface of the bottom surface 602 of the tray to "stand up" into alignment into a stacked configuration as shown in FIG. 6E. Thus, by combining the features disclosed above with one or more gathering protrusions 722, the gathering mechanism 706 in accordance with the current disclosure provide further consistency and efficiency in aligning or gathering mail items 601 within a tray, which may be helpful in preparing the tray and mail items 601 for further processing, especially in an automated system.

In the foregoing description, various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A system for gathering one or more mail items or other articles within a container having at least one opening on at least one end thereof, comprising:
   a first gathering mechanism configured to fit through the at least one opening and press against a first one of the one or more mail items or other articles, wherein the first gathering mechanism is configured to expand from a first compact state to a first expanded state, wherein a first surface contact area between the first one of the one or more mail items or other articles and the first gathering mechanism increases when the first gathering mechanism is in the first expanded state.

2. The system of claim 1, further comprising a second gathering mechanism configured to press against a second one of the one or more mail items or other articles within the container, wherein the second gathering mechanism is configured to fit through a second opening at a second end of the container and expand from a second compact state to a second expanded state, wherein a second surface contact area between the second one of the one or more mail items or other articles and the second gathering mechanism increases when the second gathering mechanism is in the second expanded state.

3. The system of claim 2, wherein the first gathering mechanism and the second gathering mechanism are configured to press the first one of the one or more mail items or other articles toward the second one of the one or more mail items or other articles.

4. The system of claim 1, wherein the first gathering mechanism further comprises a biasing member, wherein the biasing member provides a biasing force causing the first gathering mechanism to retract from the first expanded state to the first compact state.

5. The system of claim 1, wherein the first gathering mechanism further comprises a linear actuator, wherein linear movement of a translation portion of the linear actuator causes the first gathering mechanism to expand from the first compact state to the first expanded state.

6. The system of claim 1, wherein the first gathering mechanism further comprises a front link that is operatively connected to a distal end of a translation portion, wherein movement of the distal end of the translation portion causes the front link to pivot and cause the first gathering mechanism to expand from the first compact state to the first expanded state.

7. The system of claim 6, wherein the first gathering mechanism further comprises a rear link that is pivotally connected to a gathering mechanism body of the first gathering mechanism at a first rear link end and pivotally connected to the front link at a second rear link end.

8. The system of claim 7, wherein the first gathering mechanism further comprises a second front link and a second rear link, wherein a first end of the second front link is pivotally connected to the front link and the distal end of the translation portion, wherein a second end of the second rear link is pivotally connected to the gathering mechanism body and is pivotally connected to a second end of the second front link.

9. The system of claim 8, wherein the second rear link further comprises a gathering protrusion at a distal end thereof.

10. The system of claim 9, wherein the gathering protrusion is a downward most portion of the first gathering mechanism when the first gathering mechanism is in the first expanded state.

11. A method for gathering one or more mail items or other articles within a container having at least one opening on at least one end thereof, comprising:
    using a first gathering mechanism configured to press against a first of the one or more mail items or other articles within the container, wherein the first gathering mechanism is configured to fit through the at least one opening on the at least one end of the container when in a first compact state and is further configured to expand to a first expanded state, wherein the first gathering mechanism does not fit through the at least one opening when in in the first expanded state; and
    passing the first gathering mechanism through the at least one opening while in the first compact state and expanding the first gathering mechanism from the first compact state to the first expanded state once at least a portion of the first gathering mechanism has passed through the at least one opening to gather the one or more mail items or other articles within the container.

12. The method of claim 11, further comprising:
    using a second gathering mechanism configured to press against a second of the one or more mail items or other articles within the container, wherein the second gathering mechanism is configured to lit through a second opening on a second end the container when in a second compact state and is further configured to expand to a second expanded state, wherein the second gathering mechanism does not fit through the second opening when in in the second expanded state; and passing the second gathering mechanism through the second opening while in the second compact state and expanding the second gathering mechanism from the second compact state to the second expanded state once at least a portion of the second gathering mechanism has passed through the second opening to gather the one or more mail items or other articles within the container.

13. The method of claim 12, further comprising:
advancing the first gathering mechanism and the second gathering mechanism towards one another to press the first of the one or more mail items or other articles toward the second of the one or more mail items or other articles.

14. The method of claim 11, wherein the first gathering mechanism further comprises a biasing member, wherein the biasing member provides a biasing force causing the first gathering mechanism to retract from the first expanded state to the first compact state.

15. The method of claim 11, wherein the first gathering mechanism further comprises a linear actuator, wherein the linear actuator is controlled to expand the first gathering mechanism from the first compact state to the first expanded state.

16. The method of claim 15, wherein the linear actuator is connected to a series of links connected to a translation portion of the linear actuator, wherein the linear actuator is controlled to move the translation portion in a first direction, wherein moving the translation portion in the first direction causes the series of links to pivot from the first compact state to the first expanded state.

17. The method of claim 11, wherein the first gathering mechanism further comprises a gathering protrusion, wherein the gathering protrusion is moved along a bottom of the container as the first gathering mechanism expands from the first compact state to the first expanded state causing any of the one or more mail items or other articles lying along the bottom of the container to stand up within the container.

18. A gathering apparatus for gathering one or more mail items or other articles, comprising:
a gathering mechanism configured to press against a first of the one or more mail items or other articles, wherein the gathering mechanism is configured to expand from a compact state to an expanded state, wherein in the compact state the gathering mechanism is configured to fit-through an opening sized smaller than the gathering mechanism in the expanded state.

19. The gathering apparatus of claim 18, wherein the gathering apparatus is configured to gather the one or more mail items or articles within a container with the opening on at least one end thereof and at least a second opening on a second end thereof, wherein the gathering mechanism is configured to fit through the opening when in the compact state and expand from the compact state to the expanded state.

* * * * *